United States Patent [19]

Cooper

[11] 3,883,613

[45] May 13, 1975

[54] FLAME RETARDANT COMPOSITION OF POLYPHENYLENE ETHER, STYRENE RESIN AND TRIMESITYL PHOSPHATE AND PROCESS FOR THE PREPARATION THEREOF

[75] Inventor: Glenn D. Cooper, Delmar, N.Y.

[73] Assignee: General Electric Company, Pittsfield, Mass.

[22] Filed: Dec. 4, 1972

[21] Appl. No.: 311,838

[52] U.S. Cl. ........ 260/874; 260/45.7 P; 260/876 R; 260/887; 260/889; 260/898; 260/899
[51] Int. Cl. ............................................. C08g 43/02
[58] Field of Search ........... 260/874, 876 R, 45.7 P, 260/966

[56] References Cited
UNITED STATES PATENTS
3,639,506    2/1972    Haaf .................................. 260/874

*Primary Examiner*—Murray Tillman
*Assistant Examiner*—J. Ziegler
*Attorney, Agent, or Firm*—William F. Mufatti; George B. Finnegan, Jr.; Edward A. Hedman

[57] ABSTRACT

Compositions of polyphenylene ethers and styrene resins are rendered flame retardant, without loss in heat distortion properties or the need to include aromatic halogen compounds, by adding minor amounts of trimesityl phosphate.

10 Claims, No Drawings

FLAME RETARDANT COMPOSITION OF POLYPHENYLENE ETHER, STYRENE RESIN AND TRIMESITYL PHOSPHATE AND PROCESS FOR THE PREPARATION THEREOF

This invention relates to synthetic resin compositions and, more particularly, to compositions of a polyphenylene ether resin and a styrene resin which include a flame retardant amount of trimesityl phosphate and to processes for the production of such flame retardant compositions.

BACKGROUND OF THE INVENTION

Compositions of polyphenylene ethers and styrene resins are known in the art and described in Cizek, U.S. Pat. No. 3,383,435, incorporated herein by reference. Such compositions are normally flammable, even though polyphenylene ethers have excellent flame retardant properties and are classified as self-extinguishing and non-dripping according to ASTM Test Method D-635 and Underwriters' Laboratories Bulletin No. 94. The styrene resin component causes the compositions to be normally flammable, because styrene resins burn at a slow rate upon ignition, and they drip flaming resin. Consequently, even where the styrene resin is present in relatively low concentrations, the compositions with polyphenylene ethers have reduced flame retardant properties and it is somewhat difficult to meet the requirements established by various testing laboratories.

In Haaf, U.S. Pat. No. 3,639,506, it is disclosed that triphenyl phosphate is efficient as a flame retardant agent in compositions of polyphenylene ethers and styrene resins, but because of its concommitent plasticizing action, addition of triphenyl phosphate in even the small amounts necessary for flame retardancy results in a substantial decrease in the heat distortion temperature of the composition. A decrease in heat distortion temperature renders the composition unsuitable in many commercial applications.

The Haaf patent discloses that the disadvantageous aspects of using triphenyl phosphate can be overcome, by replacing part of this compound with an aromatic halogen compound, such as a highly chlorinated biphenyl. The resulting four component compositions: polyphenylene ether, styrene resin, aromatic phosphate and an aromatic halogen compound have substantially improved flame retardant properties without a depression in the heat distortion temperature to a level where commercial use is substantially impaired.

Although the Haaf patent discloses a wide variety of phosphate components, and states a preference for aryl-substituted phosphates, there is no suggestion that any of them can be used without the need for combination with an aromatic halogen component to maintain physical properties.

It has now been discovered that one particular phosphate, not disclosed specifically among the many named in the Haaf patent, namely trimesityl phosphate, functions very effectively as a flame retardant per se in compositions of a polyphenylene ether and a styrene resin. Moreover, there is surprisingly no need to use this compound in conjunction with an aromatic halogen compound to avoid adverse plasticizing effects on heat distortion temperature and other physical properties.

As will be demonstrated hereafter, compositions containing trimesityl phosphate have higher heat distortion temperatures than compositions containing an equal amount of phosphorus in the form of triphenyl phosphate.

A further advantage in using trimesityl phosphate in comparison with triphenyl phosphate is the lower rate of loss of the former due to volatility during compounding.

Still another advantage in using trimesityl phosphate as the sole flame retardant agent is in the elimination of chlorinated hydrocarbons, which tend to be somewhat toxic, from the compositions.

DESCRIPTION OF THE INVENTION

According to the present invention, there is provided a process for decreasing the self-extinguishing time of a normally flammable composition comprising
i. a polyphenylene ether of the formula

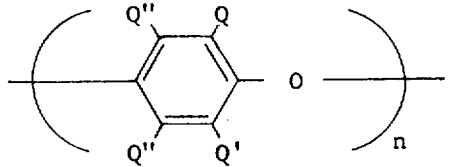

wherein the oxygen ether atom of one unit is connected to the benzene nucleus of the next adjoining unit; Q is a monovalent substituent selected from hydrogen, a hydrocarbon radical, a halohydrocarbon radical having at least two carbon atoms between the halogen atom and the phenol nucleus, hydrocarbonoxy radicals and halohydrocarbonoxy radicals having at least two carbon atoms between the halogen atom and the phenol nucleus; $Q'$ and $Q''$ are the same as Q and in addition, halogen, with the proviso that Q, $Q'$ and $Q''$ are all free of a tertiary alpha-carbon atom and $n$ is a whole number of at least 50; and
ii. a styrene resin, said process comprises adding an effective, flame retardant amount of trimesityl phosphate to said composition.

According to another feature of this invention, there are provided flame retardant compositions comprising
A. a normally flammable composition comprising
i. a polyphenylene ether of the formula

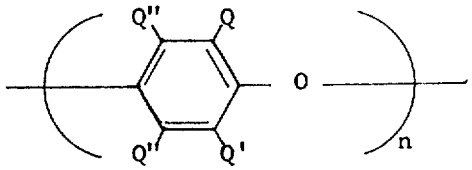

wherein the oxygen ether atom of one unit is connected to the benzene nucleus of the next adjoining unit; Q is a monovalent substituent selected from hydrogen, a hydrocarbon radical, a halohydrocarbon radical having at least two carbon atoms between the halogen atom and the phenol nucleus, hydrocarbonoxy radicals and halohydrocarbonoxy radicals having at least two carbon atoms between the halogen atom and the phenol nucleus; $Q'$ and $Q''$ are the same as Q and in addition, halogen, with the proviso that Q, $Q'$ and $Q''$ are all free of a tertiary alpha-carbon atoms and $n$ is a whole number of at least 50; and
ii. a styrene resin; and B. an effective, flame retardant amount of trimesityl phosphate.

Polyphenylene ethers represented by the formula of component (i) above and methods for their formulation may be found in U.S. Pat. Nos. 3,306,874 and 3,306,875 of Allan S. Hay and U.S. Pat. Nos. 3,257,357 and 3,257,358 of Gelu Stamatoff.

The styrene resin (ii), as is described in the above noted Cizek patent, has at least 25 percent by weight polymer units derived from the compound having the formula:

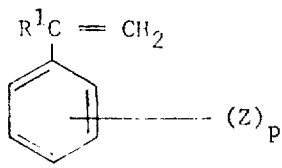

where $R^1$ is a hydrogen, (lower)alkyl or halogen; Z is a member selected from the class consisting of vinyl, halogen, and (lower)-alkyl; and $p$ is a whole number equal to from 0 to the number of replaceable hydrogen atoms on the benzene nucleus. Typical styrene resins include, by way of example, homopolymers such as polystyrene and polychlorostyrene, the modified polystyrenes such as rubber modified polystyrenes (high impact styrenes), and the styrene containing copolymers such as the styrene-acrylonitrile copolymers (SAN), styrene-butadiene copolymers, styrene-acrylonitrile-alpha-alkyl styrene copolymers, styrene-acrylonitrile-butadiene copolymers (ABS), poly-alpha-methyl styrene, copolymers of ethylvinyl benzene and divinyl benzene, and the like. (Lower)alkyl groups contain up to 6 carbon atoms.

A preferred ratio of polyphenylene ether to styrene resin comprises 20 to 80 percent by weight of the former and, correspondingly, 80 to 20 percent by weight of the latter. The polyphenylene ether is preferably poly(2,6-dimethyl-1,4-phenylene)ether. The styrene resin is preferably a rubber modified high impact polystyrene, as is described in the Cizek patent.

The trimesityl phosphate can easily be made by known methods. One convenient starting material is 2,4,6-trimethyl phenol (also known as mesitol, a virtually useless by-product in the synthesis of 2,6-xylenol). In one manner of proceeding, 100 parts of phosphorus oxychloride, 363 parts of mesitol and 0.5 parts of magnesium oxide are heated under reflux in a slow stream of nitrogen. The temperature of the mixture reaches about 240°C. in about 12 hours. Then the mixture is cooled, diluted with an equal volume of benzene and washed four times with 200 ml. portions of 10 percent aqueous sodium hydroxide solution. The organic phase is separated, dried and distilled. The portion boiling in at about 225°C. and 0.45 mm.Hg pressure is collected. It solidifies when cooled to room temperature, can be pulverized in a mortar and melts at about 105°–108°C.

The manner of adding the flame retardant to the polymer composition is not critical and does not constitute part of this invention. Preferably, each component is added as a part of a premix, the latter being passed through an extruder with extrusion temperature being maintained between about 450° and 640°F., dependent upon the composition. The strands emerging from the extruder may be cooled, chopped into pellets, re-extruded, chopped into pellets and molded to a desired shape.

The concentration of the trimesityl phosphate in the composition is not critical and is dependent to a large extent upon the concentration of the styrene resin and the particular styrene resin used. Lower concentrations of styrene resin or less flammable styrene resins require a lower concentration of the flame retardant. In general, a small concentration of the flame retardant is desirable, 0.5 to 15 parts per 100 parts of polymer (phr.) generally being acceptable and between 1 and 10 phr. being preferred where the styrene content permits.

DESCRIPTION OF THE PREFERRED EMBODIMENTS

The following examples will more fully illustrate the invention. In each example, flame retardant properties are determined according to Underwriters' Laboratories Bulletin No. 94. Following this procedure, a test bar measuring 2½ inch × ½ inch × ⅛ inch thick is twice ignited. After each (10 second) ignition, the test bar must extinguish itself within 30 seconds and the bar must not drip during the burning. Ten bars are tested and the average of the ten self-extinguishing times obtained after either the first or second ignition may not exceed 25 seconds. If any one bar of the ten burns for a period exceeding 30 seconds after either the first or second ignition, the test is considered unsuccessful.

EXAMPLE 1

Poly(2,6-dimethyl-1,4-phenylene)ether, 175 parts; 325 parts of rubber modified high impact polystyrene (Monsanto HT-91); 2.5 parts of tridecyl phosphite, 7.5 parts of polyethylene, and 49 parts of trimesityl phosphate are blended in a Waring blender and extruded in a three-fourths inch Wayne extruder (rear, 540°F.; front, 580°F.; die, 540°F.). The extruded pellets are again extruded under the same conditions and then molded into standard test bars on a 3 oz. Newbury injection molding machine (nozzle, front, rear, all 450°F.; die, 170°F.). For comparison purposes, a second composition is made in exactly the same way except that the trimesityl phosphate is replaced with 35 g. of triphenyl phosphate (total phosphorus contents are equal in each).

Test bars one-sixteenth inch thick of both compositions are tested for flammability, igniting the bars in a gas flame and measuring the time required for extinction of the flame in each bar according to the procedure of the U.L. 94 test, as modified. The molded pieces are also subjected to physical property measurements, the heat distortion temperature being measured by ASTM method D-648.

The results of the flame tests on 5 bars and the physical properties are set forth in Table 1;

Table 1

| Flammability and Physical Properties of Polyphenylene Ether and Polystyrene Compositions Containing Trimesityl Phosphate | | |
|---|---|---|
| Example | 1 | 1A* |
| Formulation (parts by weight) | | |
| poly(2,6-dimethyl-1,4-phenylene)ether** | 175 | 175 |

Table 1—Continued

| | | |
|---|---|---|
| Flammability and Physical Properties of Polyphenylene Ether and Polystyrene Compositions Containing Trimesityl Phosphate | | |
| Example | 1 | 1A* |
| high impact polystyrene*** | 325 | 325 |
| trimesityl phosphate | 49 | — |
| triphenyl phosphate | — | 35 |
| tridecyl phosphite | 2.5 | 2.5 |
| polyethylene | 7.5 | 7.5 |
| Flame Test | | |
| Time to extinction (sec.) 1st ignition | 16, 11, 12, 24, 7 | 14, 27, 20, 19, 17 |
| Time to extinction (sec.) 2nd ignition | 6, 14, 10, 1, 6 | 6, 4, 2, 1, 20 |
| Physical Properties | | |
| Heat distortion temp., °F. at 264 psi. | 211 | 201 |
| Tensile yield strength, psi | 8,800 | 8,300 |
| Elongation, % | 16 | 21 |
| Notched Izod impact, ft.lbs./in. | 1.8 | 2.2 |

*Control
**General Electric Co., PPO.
***Monsanto Co., HT-91, 9% polybutadiene-modified polystyrene.

The results in Table 1 demonstrate that compositions of polyphenylene ether and styrene resin made with trimesityl phosphate in accordance with this invention are at least equivalent in flame retardancy to those in which the same amount of phosphorus is introduced as triphenyl phosphate. Moreover, even though a greater weight percent of the trimesityl phosphate is present, the composition of Example 1 according to this invention has a significantly higher heat distortion temperature, and is comparable in other properties.

EXAMPLE 2

Poly(2,6-dimethyl-1,4-phenylene)ether, 250 parts, 250 g. of rubber modified high impact polystyrene, 7.5 parts of polyethylene, 2.5 parts of tridecyl phosphite, 0.75 parts of zinc sulfide, 0.75 parts of zinc oxide, and 21 parts of trimesityl phosphate are extruded and molded as described in Example 1. A second composition is prepared in the same way except that the trimesityl phosphate is replaced by 15 parts of triphenyl phosphate.

The average flame-out time (U.L. 94 test, first ignition) is measured on five one-sixteenth inch thick bars, and the physical properties including heat distortion temperature, are measured. The results are set forth in Table 2:

Table 2

| | | |
|---|---|---|
| Flammability And Physical Properties of Polyphenylene Ether and Polystyrene Compositions Containing Trimesityl Phosphate | | |
| Example | 2 | 2A* |
| Formulation (parts by weight | | |
| poly(2,6-dimethyl-1,4-phenylene)ether** | 250 | 250 |
| high impact polystyrene*** | 250 | 250 |
| trimesityl phosphate | 21 | — |
| triphenyl phosphate | — | 15 |
| polyethylene | 7.5 | 7.5 |
| tridecyl phosphite | 2.5 | 2.5 |
| zinc sulfide | 0.75 | 0.75 |
| zinc oxide | 0.75 | 0.75 |
| Flame Test | | |
| Time to extinction (sec.) average of 5, 1st ignition | 19 | 29 |
| Physical Properties | Properties | |
| Heat distortion temp., °F. at 264 psi. | 244 | 241 |
| Tensile yield strength, psi | 10,400 | 9,900 |
| Tensile ultimate strength, psi | 9,700 | 9,200 |
| Elongation, % | 91 | 93 |
| Notched Izod impact, ft.lbs./in. | 3.2 | 2.9 |

*Control
**Same as Example 1
***Same as Example 1.

The results in Table 2 demonstrate, at the same phosphorus contents, the compositions according to this invention containing trimesityl phosphate have a significantly decreased self-extinguishing time than those containing tridecyl phosphate. For comparison purposes, it should be noted that the compositions without either phosphate burn completely and drip after ignition. The formulations containing trimesityl phosphate are also superior in their physical properties in comparison with those containing triphenyl phosphate, even though the trimesityl phosphate is present at a higher concentration (to provide the same phosphorus content in both cases).

It is obvious that modifications can be made in light of the above examples. For instance, poly(2,6-diphenyl-1,4-phenylene)ether can be substituted for the poly(2,6-dimethyl-1,4-phenylene)ether. For the rubber modified high impact polystyrene, there can be substituted homopolystyrene or a 80:20 copolymer of styrene and methyl methacrylate.

In addition, the compositions of this invention may be formulated with other additives, for conventional purposes, such as pigments, plasticizers, fillers, reinforcements and the like. Furthermore, third component resins such as polyethylene may be added in minor concentrations without departing from the spirit or scope thereof. The compositions are useful to form films, fibers, molded articles, and the like, in accordance with conventional practice.

I claim:

1. A process for decreasing the self-extinguishing time of a normally flammable composition comprising
   i. a polyphenylene ether of the formula

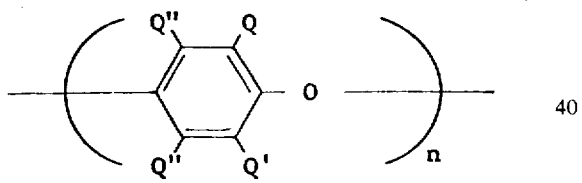

wherein the oxygen ether atom of one unit is connected to the benzene nucleus of the next adjoining unit; Q is a monovalent substituent selected from hydrogen, a hydrocarbon radical, a halohydrocarbon radical having at least two carbon atoms between the halogen atom and the phenol nucleus, hydrocarbonoxy radicals and halohydrocarbonoxy radicals having at least two carbon atoms between the halogen atom and the phenol nucleus; Q' and Q'' are the same as Q and in addition, halogen, with the proviso that Q, Q' and Q'' are all free of a tertiary alpha-carbon atom and $n$ is a whole number of at least 50; and
   ii. a styrene resin,
said process comprising adding a flame retardant compound consisting essentially of from about 0.5 to about 15 parts by weight of trimesityl phosphate per 100 parts by weight of component (i) and component (ii) to said composition.

2. A process as defined in claim 1 wherein the styrene resin is present in an amount of from about 80 to about 20 percent by weight of the weight of components (i) and (ii) in the composition and has at least 25 percent by weight of units derived from a a vinyl aromatic compound of the formula

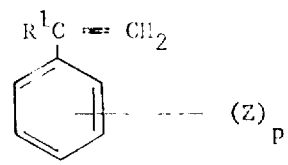

wherein $R^1$ is hydrogen, (lower)alkyl or halogen, Z is vinyl, halogen or (lower)alkyl and $p$ is 0 or a whole number equal to the number of replaceable hydrogen atoms on the benzene nucleus.

3. A process as defined in claim 1 wherein the trimesityl phosphate comprises from about 1 to about 10 parts by weight per 100 parts by weight of component (i) and component (ii).

4. A process as defined in claim 1 wherein component (i) is poly(2,6-dimethyl-1,4-phenylene)ether.

5. A process as defined in claim 2 wherein the styrene resin is a rubber-modified high impact polystyrene.

6. A flame retardant composition comprising
   A. a normally flammable composition comprising
      i. a polyphenylene ether of the formula

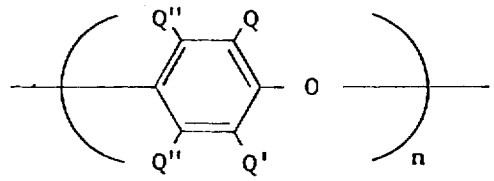

wherein the oxygen ether atom of one unit is connected to the benzene nucleus of the next adjoining unit; Q is a monovalent substituent selected from hydrogen, a hydrocarbon radical, a halohydrocarbon radical having at least two carbon atoms between the halogen atom and the phenol nucleus, hydrocarbonoxy radicals and halohydrocarbonoxy radicals having at least two carbon atoms between the halogen atom and the phenol nucleus; Q' and Q'' are the same as Q and in addition, halogen, with the proviso that Q, Q' and Q'' are all free of a tertiary alpha-carbon atom and $n$ is a whole number of at least 50; and
      ii. a styrene resin; and
   B. a flame retardant compound consisting essentially of from about 0.5 to about 15 parts by weight of trimesityl phosphate per 100 parts by weight of component (i) and component (ii).

7. A composition as defined in claim 6 wherein the styrene resin is present in an amount of from about 80 to about 20 percent by weight of the weight of components (i) and (ii) in the composition and has at least 25 percent by weight of units derived from a vinyl aromatic compound of the formula

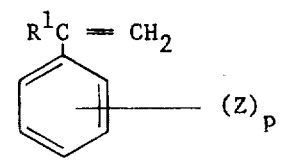

wherein $R^1$ is hydrogen, (lower)alkyl or halogen, Z is vinyl, halogen or (lower)alkyl and $p$ is 0 or a whole number equal to the number of replaceable hydrogen atoms on the benzene nucleus.

8. A composition as defined in claim 6 wherein the trimesityl phosphate comprises from about 1 to about 10 parts by weight per 100 parts by weight of component (i) and component (ii).

9. A composition as defined in claim 6 wherein component (i) is poly(2,6-dimethyl-1,4-phenylene)ether.

10. A composition as defined in claim 7 wherein the styrene resin is a rubber-modified high impact polystyrene.

* * * * *